United States Patent
Gonzalez Morin et al.

(10) Patent No.: US 12,307,732 B2
(45) Date of Patent: May 20, 2025

(54) METHODS FOR HANDLING OCCLUSION IN AUGMENTED REALITY APPLICATIONS USING MEMORY AND DEVICE TRACKING AND RELATED APPARATUS

(71) Applicant: Telefonaktiebolaget LM Ericsson (publ), Stockholm (SE)

(72) Inventors: Diego Gonzalez Morin, Galapagar (ES); Simona Gugliermo, Stockholm (SE); José Araújo, Stockholm (SE); AmirHossein Taher Kouhestani, Solna (SE); Ioannis Karagiannis, Kalamata (GR); Ananya Muddukrishna, Enskededalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 450 days.

(21) Appl. No.: 17/784,697

(22) PCT Filed: Dec. 13, 2019

(86) PCT No.: PCT/EP2019/085191
§ 371 (c)(1),
(2) Date: Jun. 13, 2022

(87) PCT Pub. No.: WO2021/115623
PCT Pub. Date: Jun. 17, 2021

(65) Prior Publication Data
US 2023/0014448 A1    Jan. 19, 2023

(51) Int. Cl.
*G06V 10/26*    (2022.01)
*G06T 5/30*    (2006.01)
(Continued)

(52) U.S. Cl.
CPC ............... *G06V 10/26* (2022.01); *G06T 5/30* (2013.01); *G06T 7/194* (2017.01); *G06T 7/248* (2017.01);
(Continued)

(58) Field of Classification Search
None
See application file for complete search history.

(56) References Cited

U.S. PATENT DOCUMENTS

| 10,965,929 B1 * | 3/2021 | Bellows ............... H04N 13/122 |
| 2007/0070200 A1 | 3/2007 | Matusik et al. |

(Continued)

FOREIGN PATENT DOCUMENTS

| JP | 2016-095849 A | 5/2016 |
| JP | 2019-514101 A | 5/2019 |

(Continued)

OTHER PUBLICATIONS

Macedo MC, Apolinario AL. Occlusion handling in augmented reality: past, present and future. IEEE Transactions on Visualization and Computer Graphics. Oct. 6, 2021;29(2):1590-609. (Year: 2021).*

(Continued)

*Primary Examiner* — Emily C Terrell
*Assistant Examiner* — Nathan J Bloom
(74) *Attorney, Agent, or Firm* — Sage Patent Group

(57) ABSTRACT

A method performed by a device for occlusion handling in augmented reality is provided. The device can generate at least one pixel classification image in a frame including an occluding object and having foreground, background, and unknown pixels. Generation of the at least one pixel classification image can include (1) calculating an initial foreground pixel probability image, and an initial background pixel probability image, and (2) calculating a normalized depth image based on depth information of the occluding (Continued)

object. The device can obtain an alpha mask to blend a virtual object and the foreground of the at least one pixel classification image based on determining a color of the unknown pixels. The device can render a final composition of an augmented reality image containing the virtual object occluded by the occluding object based on applying the alpha mask to pixels in the at least one pixel classification image.

23 Claims, 10 Drawing Sheets

(51) Int. Cl.
    *G06T 7/194*     (2017.01)
    *G06T 7/246*     (2017.01)
    *G06T 7/90*     (2017.01)
    *G06T 15/40*     (2011.01)
    *G06T 19/00*     (2011.01)
    *G06V 10/764*     (2022.01)
    *G06V 20/20*     (2022.01)

(52) U.S. Cl.
    CPC ............... *G06T 7/90* (2017.01); *G06T 15/40* (2013.01); *G06T 19/006* (2013.01); *G06V 10/764* (2022.01); *G06V 20/20* (2022.01); *G06T 2200/04* (2013.01); *G06T 2207/10016* (2013.01); *G06T 2207/20076* (2013.01); *G06T 2207/20221* (2013.01)

(56) References Cited

U.S. PATENT DOCUMENTS

| | | | | |
|---|---|---|---|---|
| 2012/0092328 | A1* | 4/2012 | Flaks | G06V 20/10 345/419 |
| 2013/0095924 | A1* | 4/2013 | Geisner | A63F 13/21 463/32 |
| 2016/0133027 | A1 | 5/2016 | Zhao et al. | |
| 2017/0358092 | A1* | 12/2017 | Bleibel | H04N 5/272 |
| 2017/0365100 | A1* | 12/2017 | Walton | G06T 15/503 |
| 2019/0057513 | A1* | 2/2019 | Jain | G06T 7/13 |
| 2019/0236788 | A1* | 8/2019 | Wang | G06T 7/11 |
| 2021/0042988 | A1* | 2/2021 | Molyneaux | G06F 3/013 |
| 2021/0142497 | A1* | 5/2021 | Pugh | G06T 7/194 |
| 2022/0191407 | A1* | 6/2022 | Knorr | G06T 7/70 |

FOREIGN PATENT DOCUMENTS

| | | |
|---|---|---|
| JP | 2019-525515 A | 9/2019 |
| KR | 10-2008-0052363 A | 6/2008 |
| WO | 2015134996 A1 | 9/2015 |
| WO | 2017164971 A2 | 9/2017 |
| WO | 2017213923 A1 | 12/2017 |
| WO | WO-2020193703 A1 * | 10/2020 ........... A61K 31/353 |

OTHER PUBLICATIONS

D. R. Walton and A. Steed, "Accurate real-time occlusion for mixed reality," in Proc. 23rd ACM Symp. Virt. Reality Softw. Technol., 2017, Art. No. 11 (Year: 2017).*

Silva, Ricardo. Dynamic Occlusion Handling for Real-Time AR Applications. Diss. Master's thesis. Instituto Superior Técnico da Universidade de Lisboa, Avenida Rovisco Pais s, Nov. 2018. (Year: 2018).*

Jorge J, Anjos RK, Silva R. Dynamic occlusion handling for real-time ar applications. InProceedings of the 17th International Conference on Virtual-Reality Continuum and Its Applications in Industry Nov. 14, 2019 (pp. 1-9). (Year: 2019).*

Notice of Reasons for Rejection, including English translation, for Japanese Patent Application No. 2022-535825 dated Oct. 10, 2023, 11 pages.

Setohara et al., "A Simple Solution of Occlusion Problem in Augmented Reality and its Application for Interaction," Transactions of The Virtual Reality Society of Japan, vol. 9, No. 4, pp. 387-396, Dec. 31, 2004 (English abstract only).

International Search Report and Written Opinion of the International Searching Authority for PCT International Application No. PCT/EP2019/085191 dated Jul. 30, 2020.

Taiki Fukiage et al., "Reduction of Contradictory Partial Occlusion in Mixed Reality by Using Characteristics of Transparency Perception," IEEE International Symposium on Mixed and Augmented Reality Science and Technology Proceedings, Nov. 5-8, 2012, pp. 129-139.

Neil Mathew, "Why is Occlusion in Augmented Reality So Hard?," Hacker Noon, Jan. 28, 2018 (originally published), 19 pages.

* cited by examiner

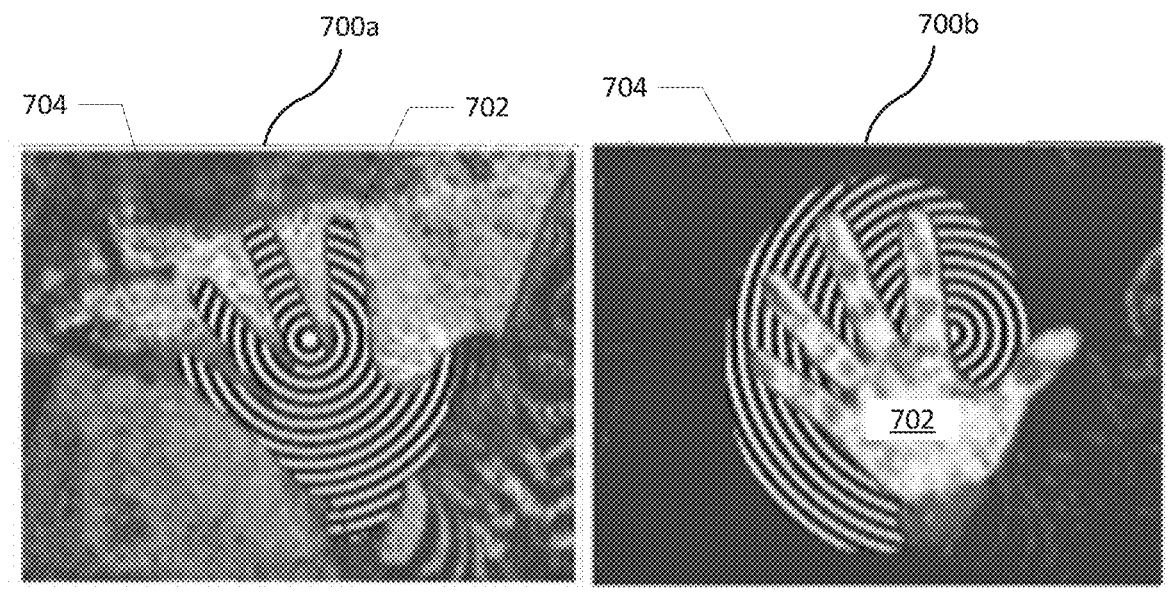
*Figure 7A*  *Figure 7B*

METHODS FOR HANDLING OCCLUSION IN AUGMENTED REALITY APPLICATIONS USING MEMORY AND DEVICE TRACKING AND RELATED APPARATUS

CROSS REFERENCE TO RELATED APPLICATION

This application is a 35 U.S.C. § 371 national stage application of PCT International Application No. PCT/EP2019/085191 filed on Dec. 13, 2019, the disclosure and content of which is incorporated by reference herein in its entirety.

TECHNICAL FIELD

The present disclosure relates generally to methods and apparatus for handling occlusion in augmented reality using memory and device tracking.

BACKGROUND

Augmented Reality (AR), including Mixed Reality (MR), is a groundbreaking technology whose popularity is increasing considerably. Early AR/MR devices were very expensive and not intended for a commercial use (e.g., Hololens by Microsoft). However, the number of new start-ups or big companies developing new MR applications (e.g., AR applications for Android and iOS, such as Froggipedia, BBC Civilisations AR, Sketch AR, Mondly, Pokemon Go, Ink Hunter, WallaMe, Google Translate, etc.), or selling affordable mounted head displays (e.g., Holokit) for smartphones (or even developing actually wearable head mounted displays (e.g., nReal) is raising rapidly. Furthermore, smartphones are coming with embedded hardware artificial intelligence (AI) capabilities to enhance the AR experiences. For instance, the new iPhone X includes an AI accelerator with a purpose of enabling more immersive AR experiences.

SUMMARY

According to some embodiments, a method performed by a device for occlusion handling in augmented reality is provided. The device can perform operations generating at least one pixel classification image in a frame. The at least one pixel classification image can include an occluding object and have a foreground with pixels classified as foreground pixels, a background with pixels classified as background pixels, and unknown pixels. Generating the at least one pixel classification image can include (1) calculating an initial foreground pixel probability image for each of one or more of the pixels of an image containing the occluding object from a foreground color probability distribution, and an initial background pixel probability image for each of one or more of the pixels based on a probability that the each of one or more of the pixels is static or dynamic, and (2) calculating a normalized depth image of the occluding object based on depth information of the occluding object. The device can perform further operations initiating an alpha matting process to obtain an alpha mask to blend a virtual object and the foreground of the at least one pixel classification image based on determining a color of the unknown pixels. The device can perform further operations rendering a final composition of an augmented reality image containing the virtual object occluded by the occluding object based on applying the alpha mask to pixels in the at least one pixel classification image.

Corresponding embodiments of inventive concepts for devices, computer products, and computer programs are also provided.

Other systems, computer program products, and methods according to embodiments will be or become apparent to one with skill in the art upon review of the following drawings and detailed description. It is intended that all such additional systems, computer program products, and methods be included within this description and protected by the accompanying embodiments.

The following explanation of potential problems is a present realization as part of the present disclosure and is not to be construed as previously known by others. Some approaches for handling occlusion in augmented reality may not be robust. In some approaches, there may be a lack of robustness in poor environmental conditions (e.g., low light condition, insufficient color contrast, etc.) or in dynamic scenes.

Thus, improved processes for handling occlusion in augmented reality are needed.

One or more embodiments of the present disclosure may include methods for handling occlusion in augmented reality using color and depth information from a device and a pose of the device, including a history of color and depth information. One or more embodiments may learn color and shape characteristics of a background and a static object(s) in a scene. In one or more embodiments, information learned can also come from previous sessions in the same scene, which may add more information to the learning process. The learned information may improve foreground and/or background classification in terms of at least accuracy, robustness and computing resources. Operations advantages that may be provided by one or more embodiments include using a history of previous frames for feature learning along with a tracked pose of a device for improved accuracy, quality and real time performance. Thus, by considering depth measurements and a three dimensional reconstructed environment, one or more embodiments may be more robust in low light and low contrast scene conditions.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 7A and 7B illustrate a normalized foreground image and a normalized background image respectively, according to some embodiments of the present disclosure;

DETAILED DESCRIPTION

Various embodiments will be described more fully hereinafter with reference to the accompanying drawings. Other embodiments may take many different forms and should not be construed as limited to the embodiments set forth herein; rather, these embodiments are provided by way of example to convey the scope of the subject matter to those skilled in the art. Like numbers refer to like elements throughout the detailed description.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1:
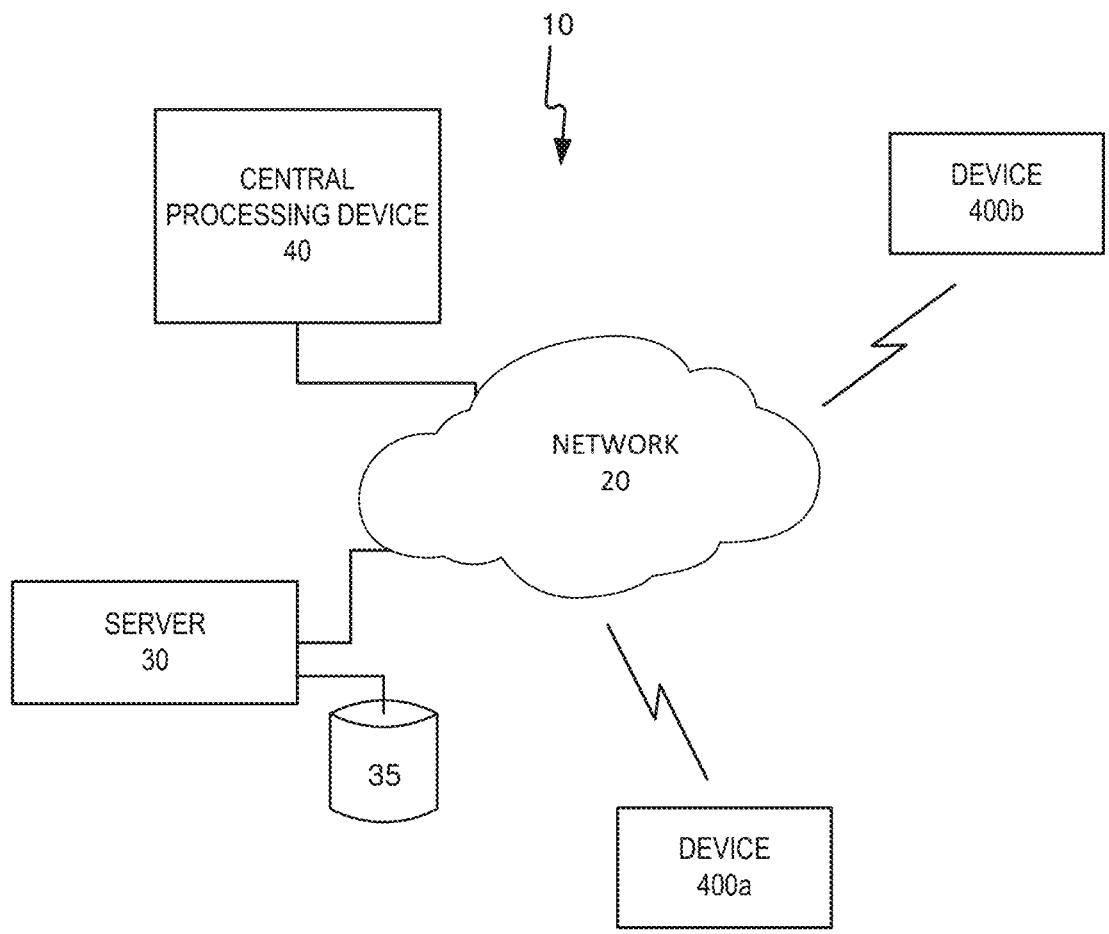
FIG. 1 illustrates a network communicatively connected to devices for handling occlusion in augmented reality according to some embodiments of the present disclosure.

FIG. 1 illustrates network 20 communicatively connected to a device (e.g., device 400a, device 400b, central processing device 40, or server 30 (which may be communicatively connected to database 35) for handling occlusion in augmented reality. As used herein, augmented reality (AR) includes, but is not limited to, mixed reality (MR).

Although the embodiment of FIG. 1 shows two devices 400a, 400b, a central processing device 40, and a server 30, other embodiments are not limited thereto. For example, a single device 400 may operate as a stand-alone device or may be communicatively connected to network 20 and/or another device (e.g., central processing device 40 or server 30). Alternatively, or additionally, a plurality of devices 400 (e.g., devices 400a and 400b) may operate as stand-alone devices or may be communicatively connected to network 20 and/or another device (e.g., central processing device 40 or server 30), etc.

Figure 2:
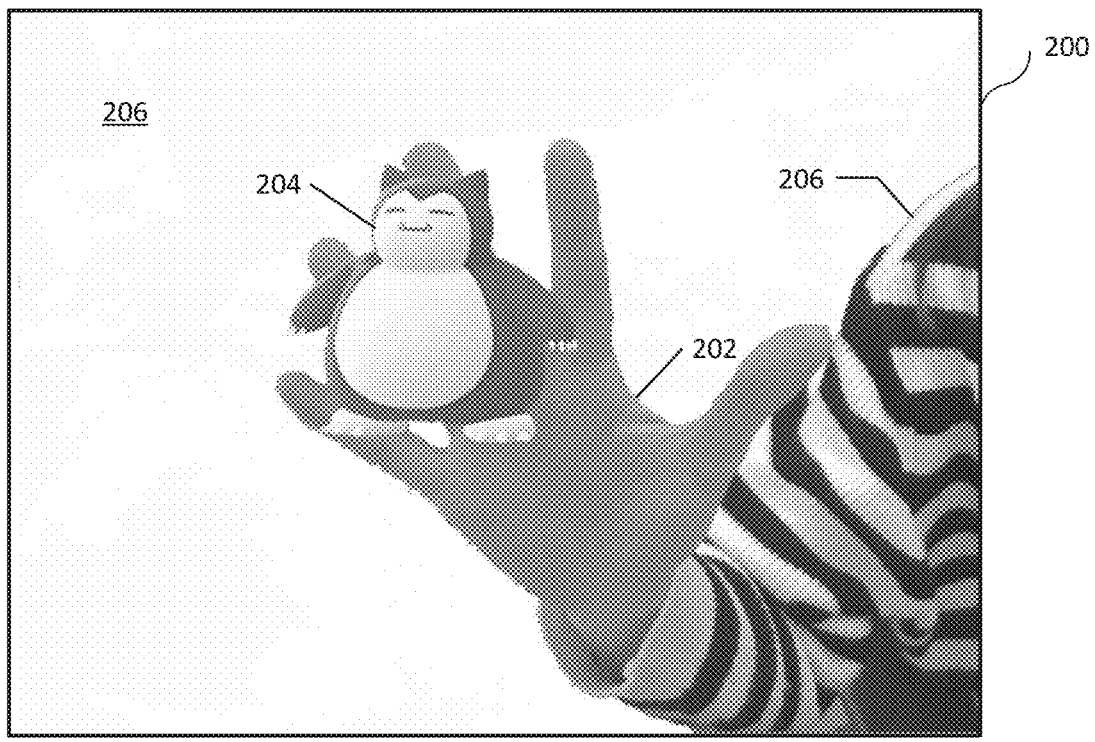
FIG. 2 illustrates virtual content placed without occlusion handling.
Figure 3:
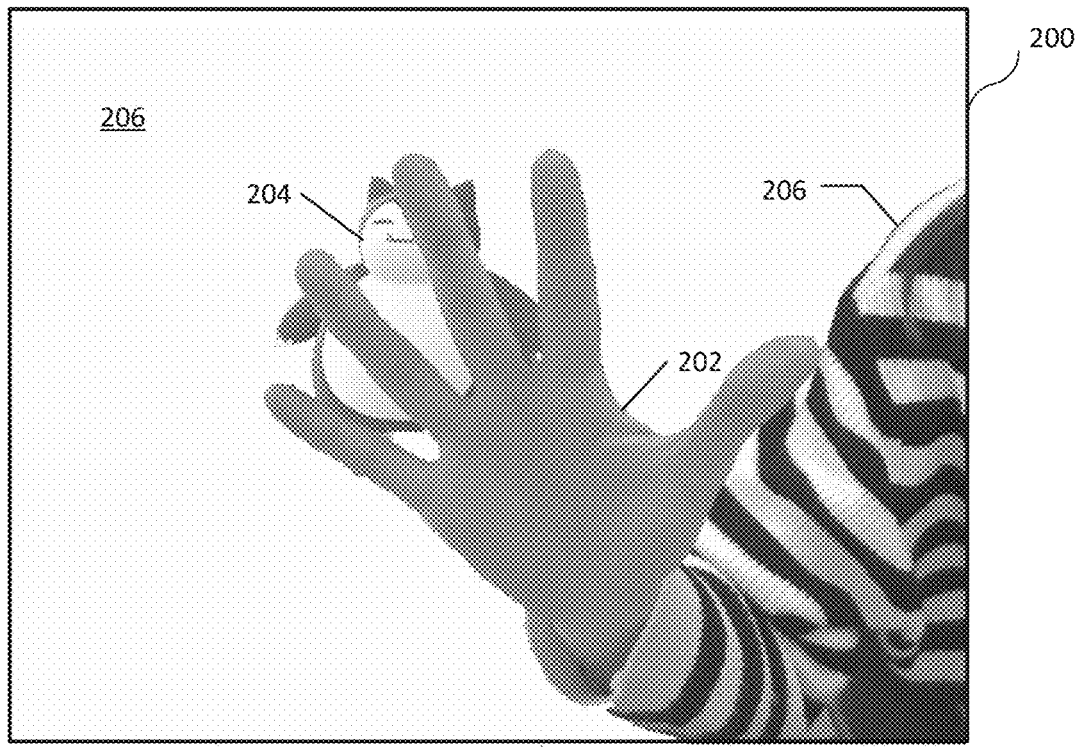
FIG. 3 illustrates the same scene with implemented occlusion handling according to some embodiments of the present disclosure.

Many problems in AR/MR are not solved, such as real time scene awareness, virtual-real worlds interaction and occlusion. Without successful solutions for these sort of problems, AR/MR technologies may not provide a fully immersive experience as the virtual content would feel detached from the real scene. Particularly sensitive is the case of occlusion, in which the pixels from virtual content should be selectively occluded by the real object(s) that are in front of the virtual content. FIG. 3 illustrates virtual content 204 that is selectively occluded by a real object (the hand) 202 that is in front of the virtual content 204. If occlusion is not handled properly, it can become very challenging for a user to understand where a virtual object(s) is placed relative to the real world. Even if a goal is not to provide an interactive virtual scene, an AR/MR experience may not be correct as it may feel as if virtual content is not placed correctly. FIG. 2 is an example of virtual content 204 that is not placed correctly, with the virtual content 204 appearing to float in front of the hand 202.

Handling occlusion for augmented reality may be a difficult problem (see e.g., "Why is Occlusion in Augmented Reality So Hard?", Jan. 28, 2018, hackernoon.com/why-is-occlusion-in-augmented-reality-so-hard-7bc8041607f9). Several groups in academia and in industry, including Facebook and Google, are attempting to solve the problem. For example, Apple released a new version of ARKit in which Apple tries to tackle an occlusion problem. However, some approaches may not be able to properly solve the problem because, e.g., the approaches may not be robust enough, performed in real-time, and/or the occluding object may be a large object (e.g. a full body of a human). It may be preferable for occlusion to be performed in real-time at the framerate of a device display and to "mask" virtual content given the real content, where both contents can be dynamic. An algorithm may need to understand what part of the virtual content is background and what is foreground, and then construct and apply a mask to occlude the pixels from the foreground that are placed on the virtual content. The mask may need to perfectly match the true background/foreground edges for an optimal AR experience. In the case of occlusion, quality and real time constraints may be important. However, this may be a hard challenge since sensor data may be noisy, and virtual content and real content may be dynamic and have various shapes and colors.

Some approaches may have tried to address this problem for static large objects with usage of depth cameras and recently using single red, green, blue (RGB) cameras (e.g. a smartphone). However, solving this problem for a dynamic environment, for example occluding a virtual toy which is being manipulated by a user's hands, is still an open problem.

As used herein, a device refers to any device for occlusion handling in augmented reality. For instance, the device may be, but is not limited to: a communication device, mobile phone, smart phone, a user equipment (UE), a medical appliance, media player, camera, or any type of consumer electronic, for instance, but not limited to, television, radio, lighting arrangement, tablet computer, laptop, or PC. The device may be a portable, pocket-storable, hand-held, computer-comprised, or vehicle-mounted mobile device, enabled to communicate voice and/or data, via a wireless or wireline connection. The device may be, but is not limited to, an augmented reality device or a cloud-based central processing device.

As used herein, a cloud-based central processing device refers to equipment capable, configured, arranged and/or operable to communicate directly or indirectly with other network nodes or equipment in the communication network to enable and/or provide occlusion handling in augmented reality and/or to perform other functions (e.g., administration) in the communication network. Examples of a cloud-based central processing device include, but are not limited to, servers, base stations (BSs) (e.g., radio base stations, Node Bs, evolved Node Bs (eNBs), gNode Bs (including, e.g., network computing node 201, etc.), access points (APs) (e.g., radio access points), etc. Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A cloud-based central processing device may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of cloud-based central processing units include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a cloud-based central processing unit may be a virtual network node. More generally, however, cloud-based central processing devices may represent any suitable device (or group of devices) capable, configured, arranged, and/or operable to enable and/or provide occlusion handling in augmented reality (including in mixed reality).

Figure 4:
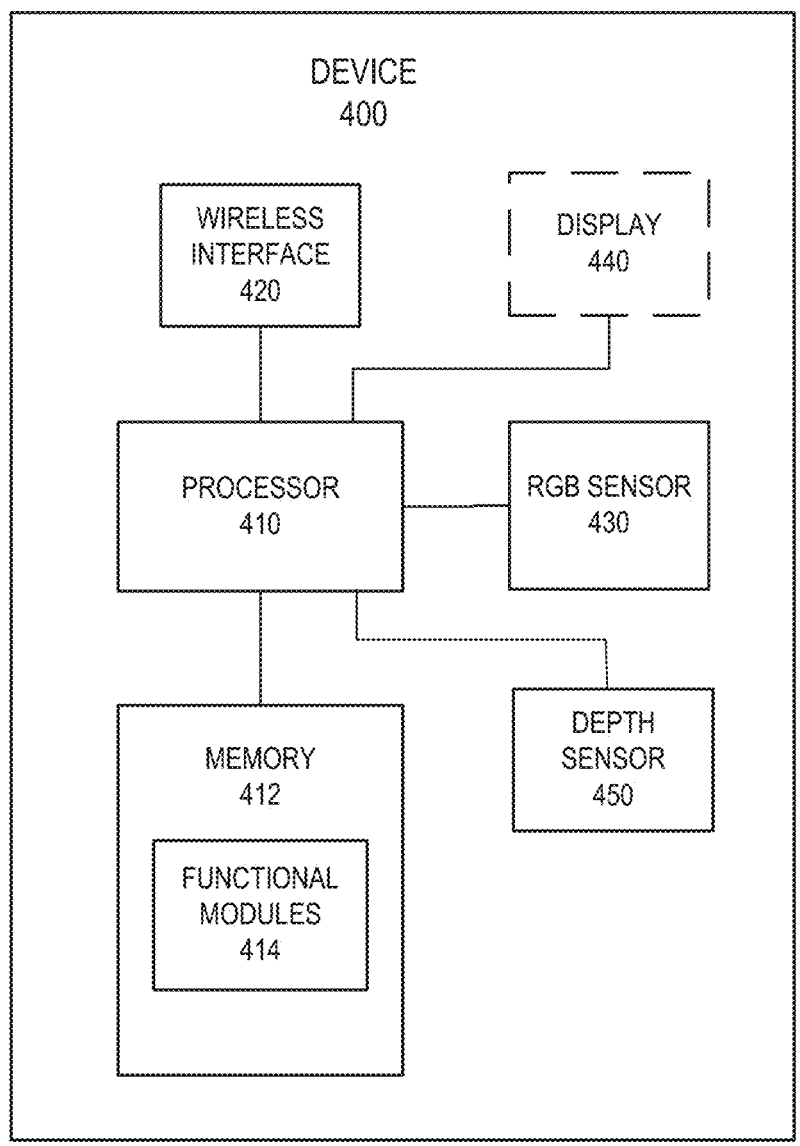
FIG. 4 is a block diagram illustrating a device according to some embodiments of the present disclosure.

FIG. 4 is a block diagram illustrating a device 400 having components that are configured according to some embodiments. The device 400 includes at least one processor 410 (also referred to as processor), at least one memory 412 (also referred to as memory), and a wireless interface 410 configured to provide communications with devices (e.g., other devices 400b, central processing unit 40, server 30, etc.). The processor 410 may include one or more data processing circuits, such as a general purpose and/or special purpose processor (e.g., microprocessor and/or digital signal processor) that may be collocated or distributed across one or more networks. The memory 412, described below as a computer readable medium, stores computer readable program code that when executed by the processor 410 causes the processor 410 to perform operations according to embodiments disclosed herein. According to other embodiments, the processor 410 may be defined to include memory so that a separate memory is not required. The device 400 may also include functional modules 414 in memory 412 that when executed by the processor 410 causes the processor 410 to perform operations according to embodiments disclosed herein. The device 400 may also include an output interface, e.g., display 440 and one or more sensors, such as RGB sensor 430 (e.g., an RGB camera) and depth sensor 450, etc.

Potential problems with some approaches may be categorized depending on the type of approach as described below.

Potential problems related to model based methods may include the following.

Model based methods may rely on computer-aided design (CAD) models of real objects in a scene to perform occlusion. Generally, in model based methods, the real objects' poses are tracked in real time, and the poses of their virtual twins are updated relative to the camera. Then, the rendering application (e.g., Unity) may automatically handle the occlusion. While this approach may perform well in structured and known scenes (e.g., industrial manufacturing AR applications), they may require too much prior information and, therefore, the approach cannot be generalized. Additionally, the objects have to be accurately tracked, which might not be always possible or computationally affordable.

Potential problems related to object based methods may include the following.

Object based methods may also need an object tracking method(s). Tracking in object based methods may be simpler as a three dimensional (3D) pose may not be necessary, and two dimensional (2D) positional tracking may be used. Generally, in object based methods, a user selects objects in the scene and contours of the objects may be given manually. Then, the position and shape of these contours may be updated in each frame. While the tracking process may be simpler than in model based methods, object based methods may require human input, there is no 3D pose awareness, and occlusion is only applied to the objects that are being tracked. Thus, object based methods may not be suitable for unknown scenes, which may be a common case.

Potential problems related to depth based methods may include the following.

Depth based methods may be more general and scalable. Generally, depth based methods may rely on both depth and color information to detect which pixels are in front of virtual content and then perform a foreground/background segmentation to try to properly merge the real and virtual pixels. In general, depth based methods may perform well on unknown environments, however, they may include two main problems: (1), depth based methods may lack robustness in low light or color contrast conditions; and (2), depth based methods may be computationally expensive to obtain high quality results (e.g., only GPU implementations may reach real time performance).

In various embodiments of the present disclosure, at least one pixel classification image may be computed based on color images, depth images, a learned 3D environment structure and dynamics of the environment. The at least one pixel classification image may be used to perform occlusion of a virtual object(s) to be displayed in an augmented reality device. As used herein, a pixel classification image refers to at least one image that incudes multiple colors where each color represents a group. For example, three pixel classification images may each include one of three colors (also referred to herein as a pixel classification trimap), where each color represents a background pixel group, a foreground pixel group, and an unknown pixel group, respectively. Alternatively, in this example, the three colors representing the background pixel group, the foreground pixel group, and the unknown pixel group may be included in a single pixel classification image. While various embodiments of the present disclosure are described as including a pixel classification trimap, the various embodiments are not so limited and may include a single (or other number) pixel classification image.

In various embodiments of the present disclosure, a device (e.g., device 400) may be provided that includes a sensor 430 capable of RGB data (e.g., an RGB camera). The device may also include a sensor 450 for capturing depth data (e.g., a depth camera or an algorithm which can convert RGB data to depth data). While various embodiments of a device of the present disclosure are described as having separate sensors for capturing RGB data and for capturing depth data, the various embodiments are not so limited and may include a single sensor for capturing RGB data and depth data. The device of various embodiments may further include a processing unit and an AR/MR rendering (also referred to herein as processing) application. The rendering application may, for example, display a virtual object at a specific position and orientation in a room.

As used in the present disclosure, a pose of a sensor(s) of the device is referred to as a pose of the device.

In various embodiments of the present disclosure, at least the following operations may be applied for a single virtual object within a field of view of a sensor of the device (e.g., a camera of the device). Operations performed by the device may include determining a pose of the device and determining color and depth frames of virtual content. Further operations performed by the device may include estimating an initial depth-based foreground and/or background segmentation; and automatically generating a pixel classification trimap. Further operations performed by the device may include applying an alpha matting algorithm to blend the virtual content and the foreground. Further operations performed by the device may include rendering a final composition.

Each of these operations will now be described further.

Determining a pose of the device may obtained, for example, from a device software development kit (SDK) and/or operating system (OS) application program interface (API).

Figures 5A, 5B:
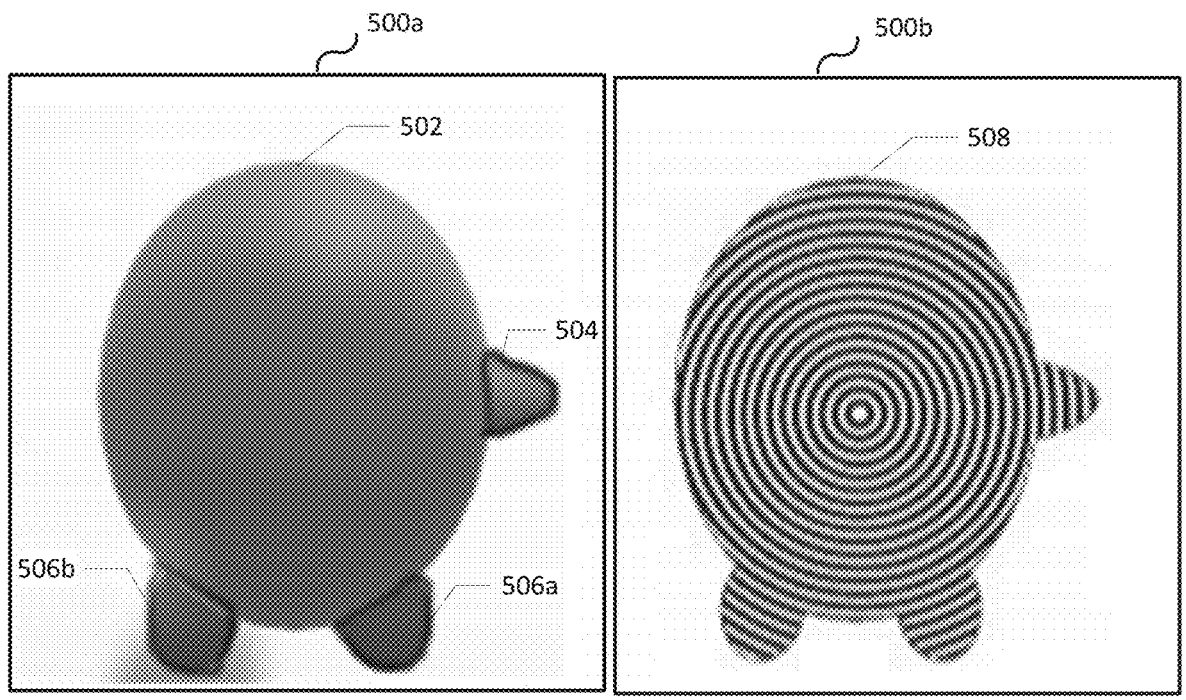
FIG. 5A illustrates an example of rendered virtual content according to some embodiments of the present disclosure.
FIG. 5B illustrates a representation of a two dimensional depth image of the virtual content according to some embodiments o the present disclosure.

Determining color and depth frames of virtual content will now be described. For example, a two-dimensional (2D) color and 2D depth image representation of the virtual content may be obtained. This can be obtained directly from an AR/MR application, e.g. from Unity. In the case of a 2D depth image, an (x,y) value may represent the pixel location, while a z value may represent the depth value for the corresponding pixel. FIGS. 5A and 5B illustrate a representation of a three-dimensional (3D) color depth map of the virtual content (FIG. 5A) and a greyscale representation of the 2D depth image (FIG. 5B). Referring to FIG. 5A, an example of rendered virtual content is illustrated. Referring to FIG. 5B, an example of information input to an algorithm is illustrated where the pixels of FIG. 5B mask the pixels from an RGB/depth input that may be further processed.

Obtaining and aligning a new color frame and corresponding depth information will now be described. New frames may be acquired by both an RGB camera (sensor) and a depth sensor. The depth frame may be transformed so that the depth pixels are aligned with the RGB pixels. This may be done using the intrinsic and extrinsic parameters from both cameras (sensors), as will be apparent to those of ordinary skill in the art. The data may also be aligned directly from the SDK, as is the case for some cameras, for example the Intel Realsense D435i camera.

Estimating initial depth-based foreground and/or background segmentation will now be described. Using the information given from determining color and depth frames of virtual content described above, the pixels for which depth is smaller than the distance between the virtual content and the camera may be classified as foreground, and other pixels may be classified as background otherwise. Additionally, if a pixel is outside the shape given in determining color and depth frames of virtual content described above, such pixels may be classified as background, regardless if the pixel(s) is closer than the virtual content or not. Doing so may avoid extra unnecessary processing.

If the mask with the shape of the virtual content given determining color and depth frames of virtual content described above is denoted as M, and d is the depth image, p is a pixel from the original RGB frame and D is the distance between the virtual content and the camera, mathematically, the foreground (F) and background (B) segmentation images may be:

$$d_s(p) = \begin{cases} F \text{ if } d(p) \leq D \text{ and } p \in M \\ B \text{ if } d(p) > D \text{ or } p \notin M \end{cases}$$

From the segments F and B, two different images may be obtained, $S_F$ and $S_B$, which contain pixels for the F and B segments, respectively, e.g. when $d_S(p)=F$ or $d_S(p)=B$, respectively. These two images may be used to obtain the color probabilities distributions $P_F$ and $P_B$. One way the color probabilities can be obtained is by calculating a histogram of $S_F$ and $S_B$.

Figure 9:
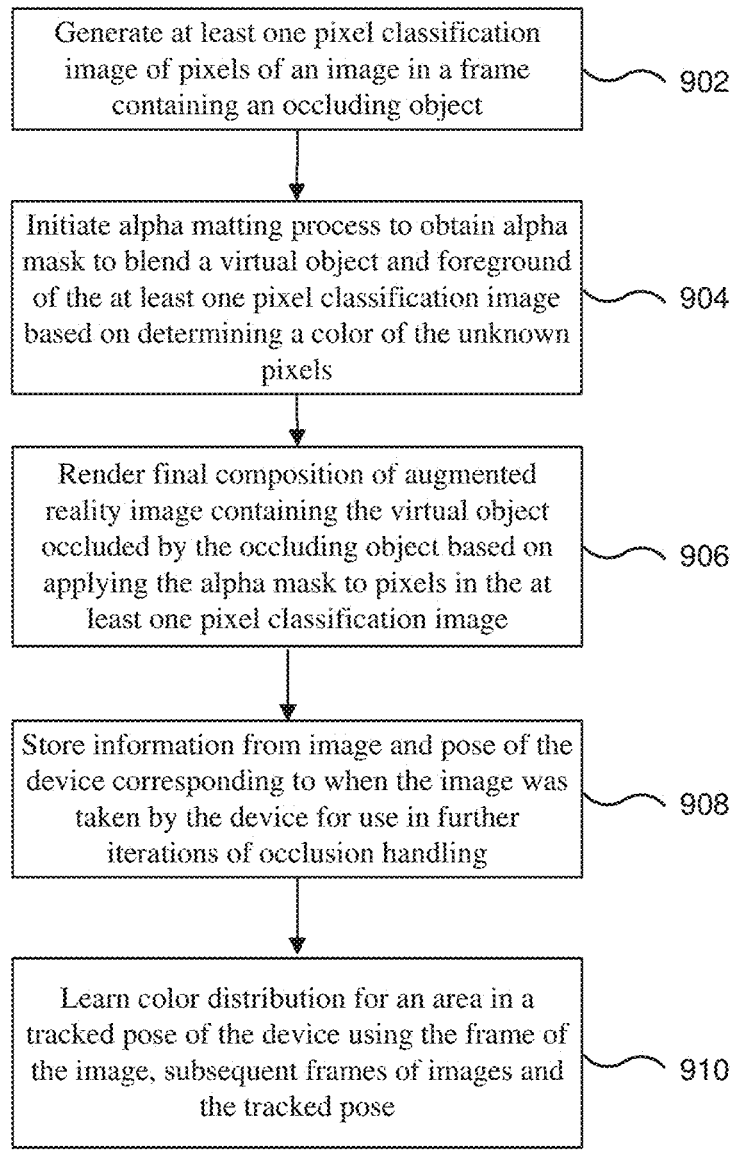
FIGS. 9-15 are flowcharts illustrating operations that may be performed by a device in accordance with some embodiments of the present disclosure.

FIG. 9 illustrates a flowchart of operations that can be performed by a device for occlusion handling in augmented reality according to various embodiments of the present disclosure. Referring to FIG. 9, the operations and associated methods include generating (902) at least one pixel classification image in a frame. The at least one pixel classification image includes an occluding object and a foreground with pixels classified as foreground pixels, a background with pixels classified as background pixels, and unknown pixels. The generating (902) includes (1) calculating an initial foreground pixel probability image for each of one or more of the pixels of an image containing the occluding object from a foreground color probability distribution, and an initial background pixel probability image for each of one or more of the pixels based on a probability that the each of one or more of the pixels is static or dynamic, and (2) calculating a normalized depth image of the occluding object based on depth information of the occluding object. The operations further include initiating (904) an alpha matting process to obtain an alpha mask to blend a virtual object and the foreground of the at least one pixel classification image based on determining a color of the unknown pixels. The operations further include rendering (906) a final composition of an augmented reality image containing the virtual object occluded by the occluding object based on applying the alpha mask to pixels in the at least one pixel classification image.

Figures 6A, 6B:
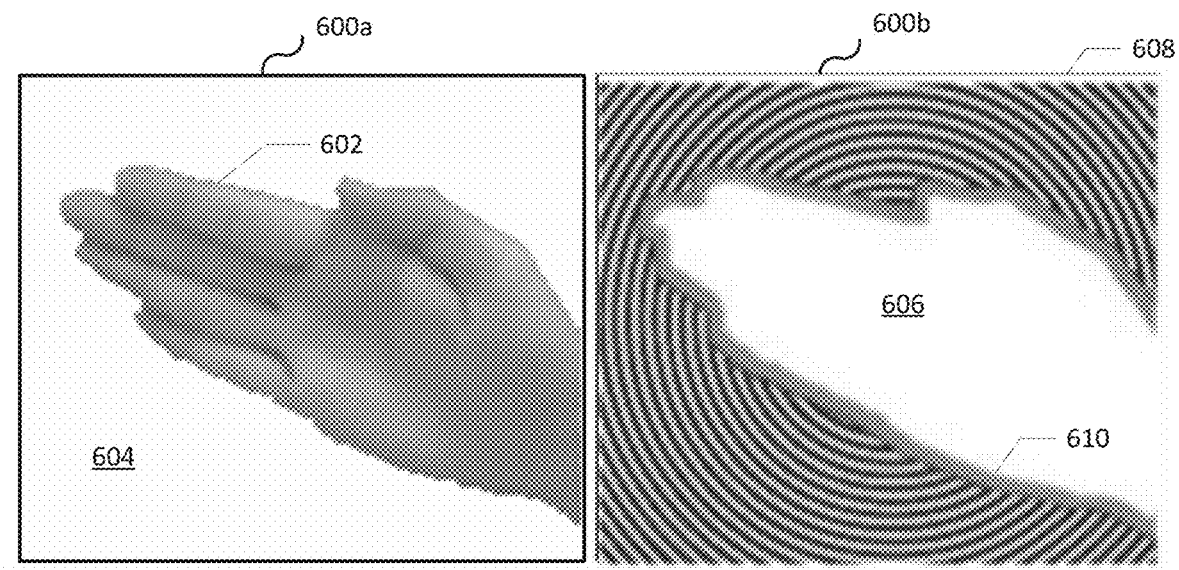
FIGS. 6A and 6B illustrate an example of an original image of an occluding object and a pixel classification trimap, respectively, according to some embodiments of the present disclosure.

Automatically generating a pixel classification trimap will now be described. In various embodiments, a trimap may classify an image in three clusters as illustrated in an example shown in FIG. 6B. Referring to FIG. 6B, a generated trimap is illustrated with foreground F pixels 606 shown with white, background B pixels 608 shown with patterned lines, and unknown U pixels 610 shown with gray. Unknown pixels (U) 610 may be pixels for which confidence is lacking that the pixel(s) is a B or F pixel(s). Generally, an appropriate trimap for the problem of occlusion may cover the real edges of the real world occluding object. An original image of the real world object 602 is shown in FIG. 6A. If not, some pixels may be misclassified, which may create an erroneous occlusion of the virtual object and a negative user experience. Additionally, as described below, a per pixel processing over each unknown pixel called alpha matting may be performed and, therefore, the smaller the number of unknown pixels, the faster an entire method may be.

The following exemplary embodiments for generating a pixel classification trimap (also referred to as a trimap) may improve or optimize both aspects of a trimap.

In a first exemplary embodiment, computing initial foreground and background pixel probability images $I_F$ and $I_B$ may be performed. The initial foreground and background pixel probability images $I_F$ and $I_B$ may be computed based on initial depth segmentation, previous learned background information, reconstructed 3D environment and pixel dynamics as described below.

The probability of each pixel being a part of the background and foreground may be calculated.

For the foreground case, the probability of each pixel being a part of the foreground, PF, may be directly used by obtaining an image $I_F$ that gathers all these probabilities: $I_F(p)=P_F(p)$.

Corresponding operations by the device when calculating an initial foreground pixel probability image for each of one or more of the pixels of the image from a foreground color probability distribution can include extracting a probability for each of the one or more of the pixels to be a part of the foreground according to a probability distribution. For example, calculating $I_F(p)=P_F(p)$, where $I_F$ is the initial foreground pixel probability image, and $P_F$ is a color probabilities distribution of the each of one or more of the foreground pixels.

In some embodiments, for the background case, there may be at least three different situations. First, if there is 3D reconstructed background information, the 3D reconstructed background information may be used to estimate the probability of a pixel being part of such background.

Corresponding operations by the device when calculating an initial background pixel probability image for each of one or more of the pixels based on a probability that the each of one or more of the pixels is static or dynamic uses a three dimensional reconstructed background to estimate an initial probability that the each of one or more of the pixels of the image is a background pixel.

In some embodiments, the initial background pixel probability image for each of one or more of the pixels is calculated based on a previously learned background probability distribution, when the one or more of the foreground pixels has been identified as corresponding to a dynamic object.

In some embodiments, the initial background pixel probability is extracted from the three dimensional reconstruct background output from a learning process.

In a case in which the background has not been reconstructed, there may be at least two other possible options to estimate such probabilities. In one case, if a background probability distribution (referred to as L) has been learned, and a pixel has been identified to correspond to a static object with sufficient confidence, L may be used to extract the probability of such pixel being part of the background. Corresponding operations by the device include obtaining the three dimensional reconstructed background by applying a reconstruction algorithm from color data or depth data from a sensor of the device.

If, however, an algorithm is not certain enough that a pixel corresponds to a static or dynamic object, then $P_B$ may be directly used. This may be summarized as follows:

$$I_B(p) = \begin{cases} P_B(p) & \text{if } (\nexists L \text{ or } P_{dy}(S_F) < T) \text{ and} \nexists V \\ L_B(p) & \text{if } (\exists L \text{ and } P_{dy}(S_F) \geq T) \text{ and } \nexists V \\ V_B(p) & \text{if } \exists V \end{cases}$$

where V refers to a 3D reconstructed background (pointcloud/mesh) as the output of the learning process, L to possible learned background probability distribution; $P_{dy}(S_F)$ is the probability of the foreground segmented pixels to be dynamic; and T is an arbitrary defined threshold.

Corresponding operations by the device when calculating an initial background pixel probability image for each of one or more of the pixels is calculated using a color distribution Pb if there is no previously learned background probability distribution L or the probability of the foreground segmented pixels to be dynamic is below a defined threshold T.

Corresponding operations by the device can include calculating the initial background pixel probability image for each of one or more of the pixels based on a previously learned background probability distribution, when the one or more of the pixels has been identified as corresponding to a dynamic object.

Corresponding operations by the device can further include extracting the initial background pixel probability from the three dimensional reconstructed background output from a learning process.

The 3D reconstructed background can be obtained by applying reconstruction algorithms such as multi-view stereo or structure from motion from color data, or a depth-based SLAM algorithm from depth data.

Corresponding operations by the device when the three dimensional reconstructed background is obtained include applying a reconstruction algorithm from color data or depth data from a sensor of the device. If V is available, a 3D pointcloud/mesh may be included as part of the virtual scene (e.g., in Unity). A 2D depth image may be obtained from this 3D representation as was described above for determining color and depth frames of virtual content. The pixels behind the virtual object that to be occluded may be set as background by constructing a binary image $V_B$. The probability $P_{dy}$ can be estimated by tracking a change of position of the pixel in consecutive frames or it can be estimated by performing a semantic understanding of what type of object the pixel belongs to via object detection methods or i measurements. Note that here $P_{dy}$ is used as a threshold to define the pixel probabilities to be part of the background or foreground.

Corresponding operations by the device to estimate the probability of foreground segmented pixels to be dynamic include tracking a change of position of the each one or more of the background pixels in consecutive frames of the image; a semantic understanding of a type of object the each one or more of the background pixels belongs to via an object detection process; and measurements from the image.

Corresponding operations by the device to calculate an initial background pixel probability image for each of one or more of the pixels based on a probability that the each of one or more of the pixels is static or dynamic can include determining that each of one or more pixels meets a probability threshold to be identified as corresponding to a static object. The operations can further include using a learned background probability distribution to extract a probability that the each of one or more pixels is part of the background.

In a second exemplary embodiment, a normalized depth image based on depth information may be computed. The depth information of the occluding element (e.g. the hand in FIG. 6A) is also used but it is first normalized to allow merging of both the depth and color probabilities information. The normalized depth image may be:

$$d^n(p) = \begin{cases} 1 & \text{if } d(p) \leq D \\ \delta(d(p)) & \text{if } \infty > d(p) > D \\ d(p) & \text{if } d(p) = 0 \end{cases} \text{ where}$$

$$\delta(d(p)) = \frac{a^{\frac{D}{D_{max}+\epsilon}} - 1}{a - 1} \text{ with } a > 1,$$

with $d^n$ the normalized distance for pixel $p_d$, $D_{max}$ the maximum distance measured by the sensor, and a is an arbitrary value that is tuned. For a larger value of a, the pixels that are very close but behind the virtual object will have values d(p) close to 1, while the rest of the pixels may have very low normalized depth values. This may give more importance to the pixels that are close in depth to the virtual object to compensate for possible depth estimation errors.

Corresponding operations by the device to calculate the normalized depth image of the occluding object based on depth information of the occluding object includes setting to one the one or more pixels which correspondent depth value is smaller than a distance D to the virtual object and the rest of the pixels have a value between one and zero given by an exponential function which assigns higher values to the one or more pixels that are closer to D.

In a third exemplary embodiment, weighted background and foreground pixel probability images $I^W_F$ and $I^W_B$ based on initial background and foreground pixel probability, normalized depth image and pixel dynamics may be computed. All images may be gathered before using arbitrary weights for each image. In order to try to make sure that the final pixel values do not saturate, the total sum of those weights may be one. These weights may be chosen according to the characteristics of the scene, the device and sensors. For instance, in very dynamic scenes, $P_{dy}$ may be trusted less than in more static scenes. The same may apply for the normalized depth information. In other words, how much to trust the normalized depth information, may depend on the characteristics of the depth sensor. For example, for a very good depth camera with low noise and high accuracy depth measurements, a higher value can be assigned to $w_d$ which is the weight for the depth information and lower value otherwise. Similarly, depending on the light conditions, the weight of the RGB information $I_F$, may be increased or decreased since the light conditions impact whether the measurements from the RGB sensor will be good or not. Therefore, one way to capture such logic can be through the following:

$$I^w_F(p) = w_c^F \cdot I_F(p) + w_d^F \cdot d^n(p) + w_{dy}^F \cdot P_{dy}(p)$$

$$I^w_B(p) = w_c^B \cdot I_B(p) + w_d^B \cdot (1 - d^n(p)) + w_{dy}^B \cdot (1 - P_{dy}(p))$$

where $w_c^F + w_d^F + w_{dy}^F = w_c^B + w_d^B + w_{dy}^B = 1$. FIGS. 7A and &B show examples of the output images $I^w_F$ and $I^w_B$, respectively.

Note that the values of $P_{dy}$ are directly used to compute the pixel values and not as a threshold as in the first exemplary embodiment described above.

Corresponding operations by the device to generate (902) the at least one pixel classification image may further include computing a weighted background pixel probability image and a weighted foreground pixel probability image based on the initial background probability image and the initial foreground pixel probability image, the normalized depth image, and a variability of the color and the depth of the one or more pixels.

In a fourth exemplary embodiment, final normalized background and foreground $I^N_B$ and $I^N_F$ pixel probability to be used as the trimap may be computed. Corresponding operations by the device to generate (902) the pixel classification trimap may further include calculating a normalized background pixel probability image and a normalized foreground pixel probability image based on: Estimating a probability for each of the one or more of the pixels to be classified as foreground or as background in the image; classifying the each of the one or more of the pixels in the image as foreground based on the estimation for each of the one or more of the pixels being higher than a defined threshold; and for the remainder of the each of the one or more of the pixels in the image that are not classified as foreground, classifying the remainder of the each of one or more of the pixels as background. The operations may further include determining the unknown pixels based on computing and dilating an edge of a foreground area of the image formed by the pixels classified as foreground.

The probability of a pixel p to be classified as foreground or background may be estimated for each pixel in the original image:

$$I^N_F(p) = \frac{I^W_F(p)}{I^W_F(p) + I^W_B(p)}$$

$$I^N_B(p) = \frac{I^W_B(p)}{I^W_F(p) + I^W_B(p)}$$

The pixels whose value of $I^N_F(p)$ is higher than an arbitrary threshold T, may be classified as foreground and the rest of the pixels may be classified as background.

The edge of this foreground area may be computed and dilated using a dilation kernel. The size N×N of this kernel can be small (N~7) as the pixel classification may be improved or optimal already. The dilated edge may be considered to be the unknown U pixels of the final trimap.

The output of this operation is the trimap with background image being $I^N_B$, the foreground image being $I^N_F$ and the unknown pixels being U. FIGS. 7A and 7B illustrate foreground image $I^N_F$ and background image $I^N_B$, respectively.

In some embodiments, the parameters $w_c^F$, $w_d^F$, $w_{dy}^F$, $w_c^B$, $w_d^B$, $w_{dy}^B$ may be dynamically changed during run time depending on the current characteristics of the scene, for example, light conditions, depth sensor noise, contrast, etc.

Corresponding operations by the device to estimate the probability for each of the one or more of the pixels to be classified as foreground or as background in the image is calculated using the weighted foreground pixel probability image and the weighted background pixel probability image. The weights used in obtaining the weighted foreground pixel probability image and the weighted background pixel probability image are dynamically changed based on characteristics of the image.

Applying an alpha matting algorithm to blend the virtual content and the foreground in accordance with various embodiments will now be described. The alpha matting operation may be important for a proper final quality in the result. Without this operation, the occlusion may not look realistic and the AR experience may not be immersive enough. A goal of this operation may be to determine a final color of the unknown U pixels so that the blend between such pixels and the virtual pixels is done in the most realistic way possible. The final color of each pixel $p_u'$ may be determined as:

$$p'_U = \alpha \cdot p_U + (1-\alpha) \cdot p_V,$$

where alpha, α, represents the alpha channel of $p_U$ calculated by an alpha matting algorithm and $p_v$ is the correspondent virtual pixel. The value of alpha may be calculated for each unknown pixel.

Corresponding operations by the device to initiate (904) an alpha matting process to obtain an alpha mask a to blend a virtual object and the foreground of the at least one pixel classification image based on determining a color of the unknown pixels cam include calculating an alpha channel for each of the one or more unknown pixels and adding a correspondent virtual pixel using an inverse alpha mask. For example, as follows:

$$p'_U = \alpha \cdot p_U + (1-\alpha) \cdot p_V$$

wherein $p'_U$ is the color of each of one or more of the unknown pixels, $\alpha \cdot p_U$ is an alpha channel of $p_u$ calculated by the alpha matting process for each of the one or more unknown pixels, and $p_V$ is a correspondent virtual pixel.

In one embodiment, the generated trimap and the original color frame may be used as input to an alpha matting algorithm as will be apparent to those of ordinary skill in the art. This process may be run inside the device. Corresponding operations by the device can use the pixel classification trimap and the image as inputs to the alpha matting process.

In some embodiments, this process may be skipped for other more important goals than the final quality (such as real time performance) to be satisfied. For example, in one embodiment, if the device requires the computation load or energy consumption to be reduced (e.g., device has low battery level, overload CPU, etc.), this process may be ignored for the real time requirements to be achieved or to increase the battery life of the device. Different thresholds may be set to decide whether to apply this process or not (e.g., battery level threshold, CPU usage threshold, etc.). If there is no automatic way to detect how well an occlusion is performed (e.g., because there is no access to the true depth values of the real objects), skipping this process may be the subject of a user decision.

In one embodiment, if this process is not applied, the foreground pixels may be considered the pixels defined by $I_F$, with the alpha value of all of them set to a maximum. Corresponding operations by the device define the foreground pixels as the pixels defined by $I_F$ and the alpha value of the pixels defined by $I_F$ is set to a maximum value.

Rendering the final composition will now be described. In one embodiment, if the AR device is a non-see through display device (e.g. handheld device as a smartphone), the final composition is done by applying the alpha mask a estimated as described above to the foreground pixels and the virtual content using the inverse mask $(1-\alpha)$, and adding the result from both operations to the background pixels.

In another embodiment, if the AR device is a see-through device (e.g., Hololens), then the virtual content is rendered and the inverse $(1-\alpha)$ alpha matting mask is applied as an occluding mask.

Corresponding operations by the device in the rendering (906) a final composition of an augmented reality image containing the virtual object occluded by the occluding object based on applying the alpha mask to pixels in the at least one pixel classification image comprises one of:

when the device is a non-see through display device, applying the alpha mask a to the foreground pixels and the virtual object of the at least one pixel classification image using the inverse alpha mask $(1-\alpha)$ and adding the result to the background pixels of the at least one pixel classification image; and when the device is a see-through device, rendering the virtual object and applying the inverse alpha mask $(1-\alpha)$ as an occluding mask in the at least one pixel classification image.

Additional exemplary embodiments will now be described.

In one embodiment, frame information along with a tracked pose of the device is processed and stored. If it was determined that no occlusion had to be handled, the entire scene is used in the post process and stored. If on the contrary, the trimap and alpha matte were estimated, then only the pixels finally classified as background are stored. This can then be used in the next iteration of the algorithm for generating the pixel classification trimap described above.

Referring to FIG. 9, corresponding operations by the device can include storing (908) information from the image and a pose of the device corresponding to when the image was taken by the device for use in further iterations of occlusion handling based on one of: storing the image when no occlusion was processed for the rendering of the final composition; and storing pixels from the image that were classified as background if the at least one pixel classification image was generated and/or the alpha mask was processed.

In another embodiment, the color distribution for an area with similar color characteristics is learned using each new frame and the pose of the device. The pose of the device is used to know where the camera is looking, and therefore, classify these color distributions into clusters with similar color characteristics. Later, depending on the pose of the device, one color distribution or other is loaded and used during the occlusion handling algorithm. This way, the algorithm loads the relevant distributions according the tracked poses of the device at that time step.

Referring to FIG. 9, corresponding operations by the device can include learning (910) a color distribution for an area in a tracked pose of the device using the frame of the image, subsequent frames of images and the tracked pose of the device based on: using the tracked pose of the device to learn where a camera of the device is looking; classifying a plurality of color distributions from each frame of a plurality of tracked poses into clusters with similar color characteristics; and selecting and using a color distribution from the plurality of color distributions during a subsequent occlusion handling process based on a subsequent pose of the device.

In another embodiment, the device may load (e.g., from hard memory, from the cloud, from another connected device), if available, the color distributions from the area where the device is located. The learning may be performed locally and then once the device moves to a different area, the new learned distributions are stored (e.g., in the hard memory, the cloud or another device). The distributions from the new area may be loaded depending on the device pose in the future.

Figure 10:
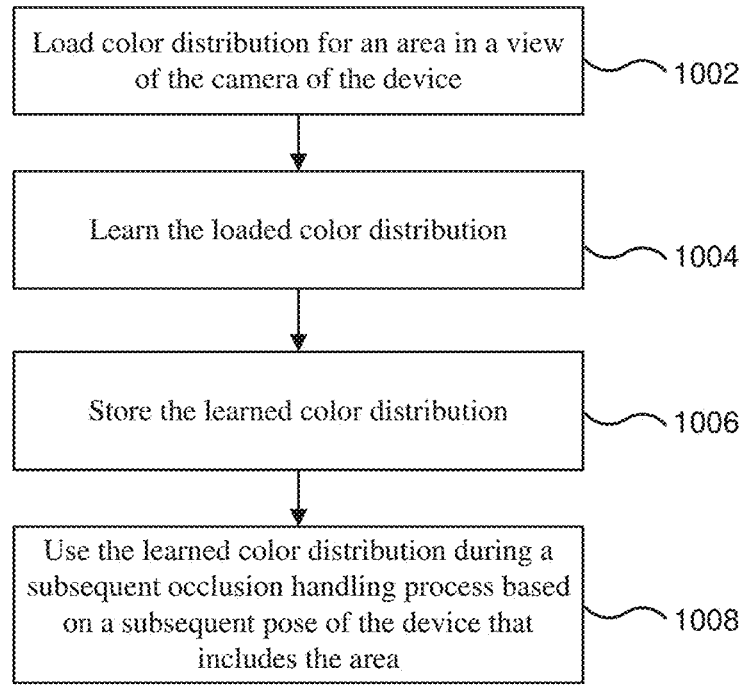

FIG. 10 illustrates a flowchart of further operations that can be performed by a device for occlusion handling in augmented reality according to some embodiments of the present disclosure. Referring to FIG. 10, the operations and associated methods can further include loading (1002) a color distribution for an area in a view of the camera of the device. The operations can further include learning (1004) the loaded color distribution. The operations can further include storing (1006) the learned color distribution; and using (1008) the learned color distribution during a subsequent occlusion handling process based on a subsequent pose of the device that includes the area.

In another embodiment, if the memory capabilities of the device are not sufficient, the color, depth and pose information may be sent continuously to the cloud or other connected device where the learning process may happen as a background process. While locally, the calculated distribution may be updated according to the tracked pose when the camera moves towards another area (clustered group), and then the correspondent distribution may be downloaded (if any).

Figure 11:
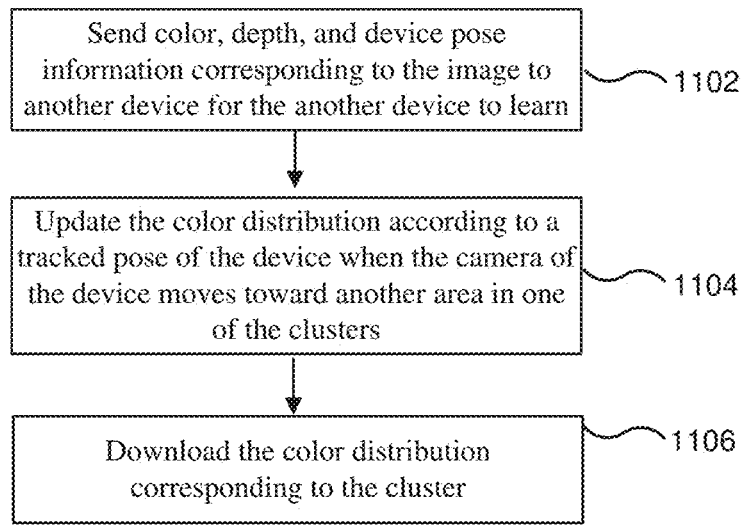

FIG. 11 illustrates a flowchart of further operations that can be performed by a device for occlusion handling in augmented reality according to some embodiments of the present disclosure. Referring to FIG. 11, the operations and associated methods can further include sending (1102) color, depth, and device pose information corresponding to the image to another device for the another device to learn. The operations can further include updating (1104) the color distribution according to a tracked pose of the device when the camera of the device moves toward another area in one of the clusters; and downloading (1106) the color distribution corresponding to the cluster.

In another embodiment, using the pose evolution between two frames, including the color and depth information, each pixel may be classified to be part of a moving or static object. This estimation may be added to a learning process as only the static objects should be learned. By doing this, pixels of the dynamic object(s) are not learned, which may happen for the case in which dynamic objects are behind the virtual object, or in the cases in which there is no virtual object(s) in the field of view of the camera.

Figure 12:
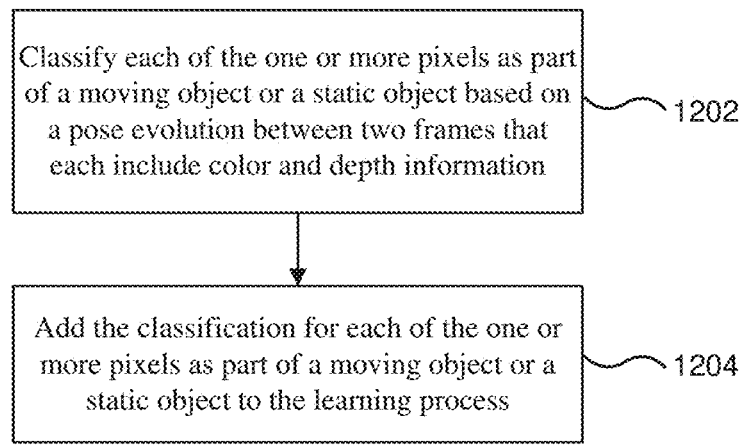

FIG. 12 illustrates a flowchart of further operations that can be performed by a device for occlusion handling in augmented reality according to some embodiments of the present disclosure. Referring to FIG. 12, the operations and associated methods can further include classifying (1202) each of the one or more pixels as part of a moving object or a static object based on a pose evolution between two frames that each include color and depth information. The operations can further include adding (1204) the classification for each of the one or more pixels as part of a moving object or a static object to the learning process.

In another embodiment, the object of interest that usually occludes the virtual content (e.g., hands) may be modelled and tracked, and their pose and model may be used in the probability distributions described above for generating a pixel classification trimap.

Figure 13:
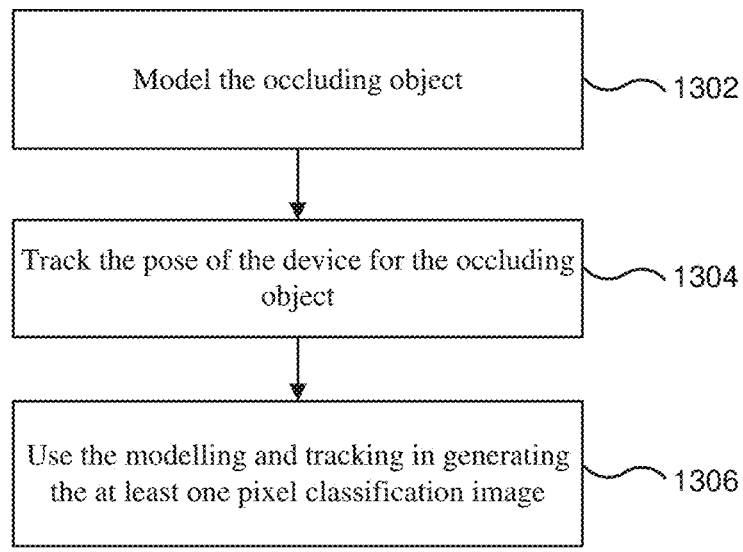

FIG. 13 illustrates a flowchart of further operations that can be performed by a device for occlusion handling in augmented reality according to some embodiments of the present disclosure. Referring to FIG. 13, the operations and associated methods can further include modelling (1302) the occluding object. The operations can further include tracking (1304) the pose of the device for the occluding object; and using (1306) the modelling and tracking in generating the at least one pixel classification image.

In another embodiment, the frames may be used to apply computationally expensive 3D reconstruction algorithms which can later be used to improve the occlusion estimation as described above for generating a pixel classification trimap.

Figure 14:
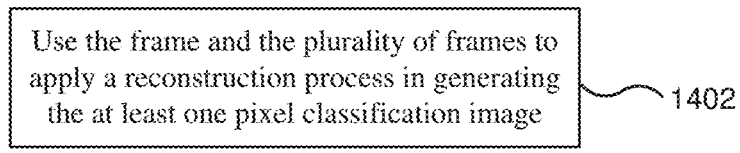

FIG. 14 illustrates a flowchart of further operations that can be performed by a device for occlusion handling in augmented reality according to some embodiments of the present disclosure. Referring to FIG. 14, the operations and associated methods can further include using (1402) the frame and the plurality of frames to apply a reconstruction process in generating the at least one pixel classification image.

Exemplary embodiments for cases with multiple virtual objects will now be described.

In one embodiment, if there is more than one virtual object, the virtual poses, as rendered in the AR application, of the currently visible objects may be set as input to the algorithm. As in determining color and depth frames of virtual content for a single virtual content, a binary image with the shape of the virtual content is sent (only one binary image including all the virtual shapes), in which the pixel corresponding to one object have different grayscale value from the pixels correspondent to another virtual object.

Corresponding operations by the device when the frame contains a plurality of virtual objects can include wherein the generating (902) the at least one pixel classification image includes the plurality of virtual objects; the initiating (904) an alpha matting process includes the plurality of virtual objects; and the rendering (906) the final composition of an augmented reality image contains the plurality of virtual objects.

In some embodiments, estimating the initial depth-based foreground and/or background segmentation described above for a single virtual content may be modified so the segmentation is not only foreground/background, but as many foreground segments as virtual objects.

Accordingly, a pixel classification trimap having a plurality of virtual objects may include a foreground having a plurality of foreground segments corresponding to the plurality of virtual objects with each foreground segment having pixels classified as foreground pixels, a background with pixels classified as background pixels, and unknown pixels.

In another embodiment, for each of the virtual objects, the estimated color pixels that are in front of such object can be set to have a unique arbitrary gray color, as described in the previous embodiment:

$$p_s(p) = \begin{cases} F_i & \text{if } d(p) \leq D_i \text{ and } p \in M_i \\ B & \text{if } d(p) > D_{max} \end{cases},$$

where $F_i$ is an arbitrary grayscale value assigned to the virtual object i.

Corresponding operations by the device can include, for each of the plurality of virtual objects, the pixels of the foreground segment corresponding to a virtual object of the plurality of virtual objects have a gray color calculated based on an arbitrary grayscale value assigned to the virtual object for each of the pixels having a depth that is less than the maximum distance measured by a sensor of the device, and are classified as background for each of the pixels having a depth that is greater than the maximum distance measured by the sensor of the device.

In another embodiment, the normalized distance described above for generating a pixel classification trimap for a single virtual object, may be for the case of multiple visible virtual objects:

$$d^n(p) = \begin{cases} 1 & \text{if } p_d(p) \leq D_i \text{ and } p \notin M_i \\ \delta_i(d(p)) & \text{if } \infty > p_d(p) > D_i \\ d(p) & \text{if } p_d(p) = 0 \end{cases}$$

where $$\delta_i(d(p)) = \frac{a^{\frac{D_i}{D_{max}+\epsilon}} - 1}{a - 1}$$

with $\alpha > 1$.

Corresponding operations by the device can include where the normalized depth image of the occluding object based on depth information of the occluding is calculated by setting to one the one or more pixels which correspondent depth value is smaller than the distance D to the virtual object and the rest of the pixels have a value between one and zero given by an exponential function which assigns higher values to the one or more pixels that are closer to D.

In another embodiment, the process if identical to the single virtual object case, with a modification in how the estimated alpha value is calculated, may be as follows:

$$p'_U = \alpha \cdot p_U + (1-\alpha) \cdot p_v^i,$$

where $p_v^i$ is the virtual pixel of the virtual object i. Therefore, using the initial grayscale image generated in the first embodiment of the multi-virtual object case, it may be directly inferred to which virtual pixel corresponds the pixel $p_U$, and therefore, the value of $p_v^i$ for such pixel.

Corresponding operations by the device can include, the initiating (904) an alpha matting process to obtain an alpha mask to blend a plurality of virtual objects and the foreground of the at least one pixel classification image based on determining a color of the unknown pixels can include calculating an alpha channel for each of the one or more unknown pixels and adding a correspondent virtual pixel of a virtual object. For example, as follows:

$$p^{iU} = \alpha \cdot p_U + (1-\alpha) \cdot p_v^i,$$

wherein $p_v^i$ is a virtual pixel of a virtual object i.

In various embodiments, the processes may be performed in a cloud-based implementation. In one embodiment, applying an alpha matting algorithm to blend the virtual content and the foreground may be performed in a cloud based implementation. A subset of pixels from both the original image and the trimap may be sent to an external server for fast graphics processing unit (GPU) based alpha matting processing and only the final color of those pixels may be sent back in response. The pixels sent from the device to the cloud may be the pixels corresponding to the unknown pixels U and a small neighborhood of size K around those pixels. The size of the neighborhood K may depend on the dynamics of the scene. For example, the speed of both the camera and the dynamic object(s) in the scene may be considered to decide the size of K. K may be defined as $K = F(C_{pose}, V_{DO}^0, V_{DO}^1, \ldots, V_{DO}^i)$.

Corresponding operations by the device can include, the initiating (904) an alpha matting process to obtain an alpha mask to blend a virtual object and the foreground of the at least one pixel classification image based on determining a color of the unknown pixels includes sending the unknown pixels and a region, K, around each of the unknown pixels to a server to perform the alpha matting process. The region, K, can be determined based on a scene in the image. Further operations can include receiving a color of the unknown pixels and the region, K, from the server.

In another embodiment, processing a new frame may be performed in a cloud based implementation. A frame may be sent directly to the cloud to be processed and apply the learning algorithm or the 3D reconstruction algorithm (or both). No post processing may be done in the device.

Accordingly, the device can be a cloud-based central processing device (e.g., central processing device 40).

Figure 8:
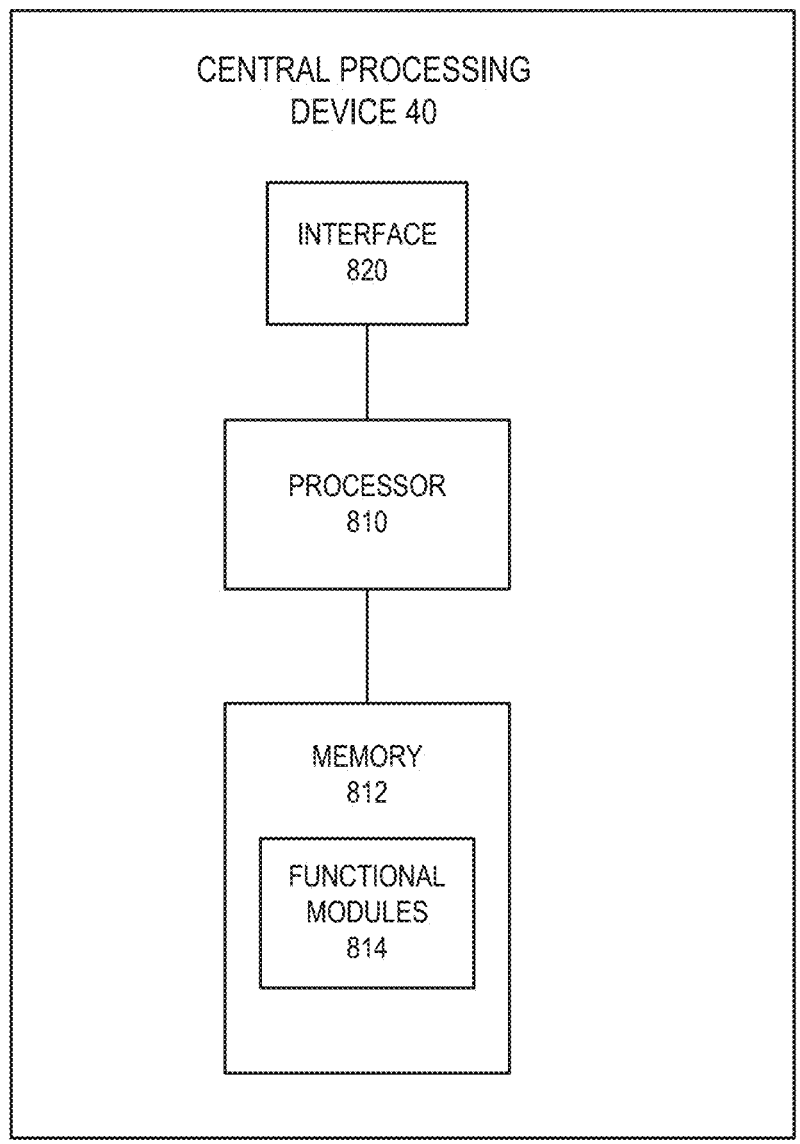
FIG. 8 is a block diagram illustrating a central processing device according to some embodiments of the present disclosure.

FIG. 8 is a block diagram of a central processing device 40, which may correspond to a device that is a cloud-based central processing device in FIG. 1, that is configured according to some embodiments. The central processing device 40 includes at least one processor 810 (also referred to as processor), at least one memory 812 (also referred to as memory), and an interface 820 configured to provide communications with devices (e.g., other devices 400a, 400b, server 30, etc.). The processor 810 may include one or more data processing circuits, such as a general purpose and/or special purpose processor (e.g., microprocessor and/or digital signal processor) that may be collocated or distributed across one or more networks. The memory 812, described below as a computer readable medium, stores computer readable program code that when executed by the processor 810 causes the processor 810 to perform operations according to embodiments disclosed herein. According to other embodiments, the processor 810 may be defined to include memory so that a separate memory is not required. The central processing device 40 may also include functional modules 814 in memory 812 that when executed by the processor 810 causes the processor 810 to perform operations according to embodiments disclosed herein.

In another embodiment, the device loads from the cloud the learned distribution and/or 3D reconstructed mesh when it moves to a new area or within a scene and the information from the previously visited area is erased.

Figure 15:
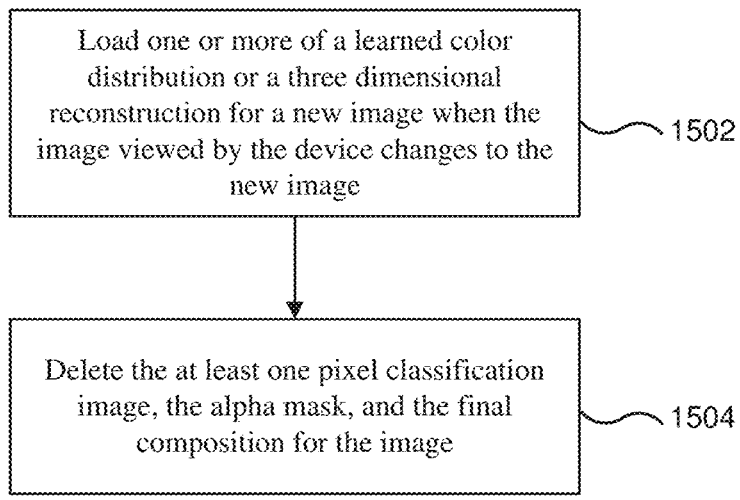

FIG. 15 illustrates a flowchart of further operations that can be performed by a device for occlusion handling in augmented reality according to some embodiments of the present disclosure. Referring to FIG. 15, the operations and associated methods can further include loading (1502) from a server one or more of a learned color distribution or a three dimensional reconstruction for a new image when the image viewed by the device changes to the new image. The operations can further include deleting (1504) the at least one pixel classification image, the alpha mask, and the final composition for the image.

Each of the operations described in FIGS. 9-15 can be combined and/or omitted in any combination with each other, and it is contemplated that all such combinations fall within the spirit and scope of this disclosure.

According to some embodiments, a computer program can be provided that includes instructions which, when executed on at least one processor, cause the at least one processor to carry out methods performed by the network computing device.

According to some embodiments, a computer program product can be provided that includes a non-transitory computer readable medium storing instructions that, when executed on at least one processor, cause the at least one processor to carry out methods performed by the network computing device.

Aspects of the present disclosure have been described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the embodiments below are intended to include any disclosed structure, material, or act for performing the function in combination with other embodiments. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Exemplary embodiments are provided below. Reference numbers/letters are provided in parenthesis by way of example/illustration without limiting example embodiments to particular elements indicated by reference numbers/letters.

What is claimed is:

1. A method for occlusion handling in augmented reality performed by a device, the method comprising:
    generating at least one pixel classification image in a frame,
        wherein the at least one pixel classification image includes an occluding object and has pixels comprising a foreground with pixels classified as foreground pixels, a background with pixels classified as background pixels, and unknown pixels,
        wherein the generating comprises (1) calculating an initial foreground pixel probability image defining, for each of one or more of the pixels of an image containing the occluding object, a probability from a foreground color probability distribution that the pixel is a foreground pixel, and an initial background pixel probability image defining, for each of one or more of the pixels, on a probability that the each of one or more of the pixels is static or dynamic, (2) calculating a normalized depth image of the occluding object based on depth information of the occluding object, and (3) computing a weighted background pixel probability image and a weighted foreground pixel probability image based on the initial background probability image and the initial foreground pixel probability image, the normalized depth image, and a variability of the color and the depth of the one or more pixels;
    initiating an alpha matting process to obtain an alpha mask to blend a virtual object and the foreground of the at least one pixel classification image based on determining a color of the unknown pixels; and
    rendering a final composition of an augmented reality image containing the virtual object occluded by the occluding object based on applying the alpha mask to pixels in the at least one pixel classification image.

2. The method of claim 1, wherein the calculating an initial background pixel probability image for each of one or more of the pixels based on a probability that the each of one or more of the pixels is static or dynamic comprises using a three dimensional reconstructed background to estimate an initial probability that the each of one or more of the pixels of the image is a background pixel.

3. The method of claim 1, wherein the calculating an initial background pixel probability image for each of one or more of the pixels comprises using a color probability distribution Pb for background pixels if there is no previously learned background probability distribution L or the probability of the foreground segmented pixels to be dynamic is below a defined threshold T.

4. The method of claim 1, wherein the initial background pixel probability image for each of one or more of the pixels is calculated based on a previously learned background probability distribution, when the one or more of the foreground pixels has been identified as corresponding to a dynamic object.

5. The method of claim 1, wherein the probability of foreground segmented pixels to be dynamic is estimated by one of:
    tracking a change of position of the each one or more of the background pixels in consecutive frames of the image;

performing a semantic understanding of a type of object the each one or more of the background pixels belongs to via an object detection process; and measurements from the image containing the occluding object.

6. The method of claim 1, wherein the calculating an initial background pixel probability image for each of one or more of the pixels based on a probability that the each of one or more of the pixels is static or dynamic comprises:

determining that the each of one or more pixels meets a probability threshold to be identified as corresponding to a static object; and using a learned background probability distribution to extract a probability that the each of one or more pixels is part of the background.

7. The method of claim 1, wherein the normalized depth image of the occluding object based on depth information of the occluding object is calculated by setting to one the one or more pixels having a determined depth value that is smaller than the distance D to the virtual object and the remainder of the pixels have a value between one and zero given by an exponential function which assigns higher values to the one or more pixels that are closer to D.

8. The method of claim 1, wherein the generating the at least one pixel classification image further comprises:

calculating a normalized background pixel probability image and a normalized foreground pixel probability image based on:

estimating a probability for each of the one or more of the pixels to be classified as foreground or as background in the image;

classifying the each of the one or more of the pixels in the image as foreground based on the estimation for each of the one or more of the pixels being higher than a defined threshold;

for the remainder of the each of the one or more of the pixels in the image that are not classified as foreground, classifying the remainder of the each of one or more of the pixels as background; and determining the unknown pixels based on computing and dilating an edge of a foreground area of the image formed by the pixels classified as foreground.

9. The method of claim 1, wherein the estimating a probability for each of the one or more of the pixels to be classified as foreground or as background in the image is calculated using the weighted foreground pixel probability image and the weighted background pixel probability image, wherein the weights used in obtaining the weighted foreground pixel probability image and the weighted background pixel probability image are dynamically changed based on characteristics of the image.

10. The method of claim 1, wherein the initiating an alpha matting process to obtain an alpha mask a to blend a virtual object and the foreground of the at least one pixel classification image based on determining a color of the unknown pixels comprises calculating an alpha channel for each of the one or more unknown pixels and adding a correspondent virtual pixel using an inverse alpha mask.

11. The method of claim 10, wherein the alpha matting process uses the at least one pixel classification image and the image as inputs.

12. The method of claim 9, wherein the foreground pixels are defined as the pixels defined by $I_F$ and the alpha value of the pixels defined by $I_F$ is set to a maximum value.

13. The method of claim 1, wherein the rendering a final composition of an augmented reality image containing the virtual object occluded by the occluding object based on applying the alpha mask to pixels in the at least one pixel classification image comprises one of:

when the device is a non-see through display device, applying the alpha mask a to the foreground pixels and the virtual object of the at least one pixel classification image using the inverse alpha mask $(1-\alpha)$ and adding the result to the background pixels of the at least one pixel classification image; and when the device is a see-through device, rendering the virtual object and applying the inverse alpha mask $(1-\alpha)$ as an occluding mask in the at least one pixel classification image.

14. The method of claim 1, further comprising:

storing information from the image and a pose of the device corresponding to when the image was taken by the device for use in further iterations of occlusion handling based on one of:

storing the image when no occlusion was processed for the rendering of the final composition; and storing pixels from the image that were classified as background if the at least one pixel classification image was generated and/or the alpha mask was processed.

15. The method of claim 1, further comprising:

learning a color distribution for an area in a tracked pose of the device using the frame of the image, subsequent frames of images and the tracked pose of the device based on:

using the tracked pose of the device to learn where a camera of the device is looking;

classifying a plurality of color distributions from each frame of a plurality of tracked poses into clusters with similar color characteristics; and selecting and using a color distribution from the plurality of color distributions during a subsequent occlusion handling process based on a subsequent pose of the device.

16. The method of claim 1, further comprising:

loading a color distribution for an area in a view of the camera of the device;

learning the loaded color distribution;

storing the learned color distribution; and using the learned color distribution during a subsequent occlusion handling process based on a subsequent pose of the device that includes the area.

17. The method of claim 1, wherein the initiating an alpha matting process to obtain an alpha mask to blend a plurality of virtual objects and the foreground of the at least one pixel classification image based on determining a color of the unknown pixels comprises calculating an alpha channel for each of the one or more unknown pixels and adding a correspondent virtual pixel of a virtual object.

18. The method of claim 1, wherein the initiating an alpha matting process to obtain an alpha mask to blend a virtual object and the foreground of the at least one pixel classification image based on determining a color of the unknown pixels comprises:

sending the unknown pixels and a region, K, around each of the unknown pixels to a server to perform the alpha matting process, wherein the region, K, is determined based on a scene in the image; and receiving a color of the unknown pixels and the region, K, from the server.

19. The method of claim 1, wherein the device is an augmented reality device.

20. The method of claim 1, wherein the device is a cloud-based central processing device.

21. The method of claim 1, further comprising:

loading from a server one or more of a learned color distribution or a three dimensional reconstruction for a new image when the image viewed by the device changes to the new image; and deleting the at least one pixel classification image, the alpha mask, and the final composition for the image.

22. A device comprising:

processing circuitry; and memory coupled with the processing circuitry, wherein the memory includes instructions that when executed by the processing circuitry causes the device to perform operations comprising:

generating at least one pixel classification image in a frame, wherein the at least one pixel classification image includes an occluding object and has pixels comprising a foreground with pixels classified as foreground pixels, a background with pixels classified as background pixels, and unknown pixels, wherein the generating comprises (1) calculating an initial foreground pixel probability image defining for each of one or more of the pixels of an image containing the occluding object, a probability from a foreground color probability distribution that the pixel is a foreground pixel, and an initial background pixel probability image defining, for each of one or more of the pixels, a probability that the each of one or more of the pixels is static or dynamic, (2) calculating a normalized depth image of the occluding object based on depth information of the occluding object, and (3) computing a weighted background pixel probability image and a weighted foreground pixel probability image based on the initial background probability image and the initial foreground pixel probability image, the normalized depth image, and a variability of the color and the depth of the one or more pixels;

initiating an alpha matting process to obtain an alpha mask to blend a virtual object and the foreground of the at least one pixel classification image based on determining a color of the unknown pixels; and rendering a final composition of an augmented reality image containing the virtual object occluded by the occluding object based on applying the alpha mask to pixels in the at least one pixel classification image.

23. A computer program product comprising a non-transitory storage medium including program code to be executed by processing circuitry of a device, whereby execution of the program code causes the device to perform operations comprising:

generating at least one pixel classification image in a frame, wherein the at least one pixel classification image includes an occluding object and has pixels comprising a foreground with pixels classified as foreground pixels, a background with pixels classified as background pixels, and unknown pixels, wherein the generating comprises (1) calculating an initial foreground pixel probability image defining for each of one or more of the pixels of an image containing the occluding object a probability from a foreground color probability distribution that the pixel is a foreground pixel, and an initial background pixel probability image defining, for each of one or more of the pixels, a probability that the each of one or more of the pixels is static or dynamic, (2) calculating a normalized depth image of the occluding object based on depth information of the occluding object, and (3) computing a weighted background pixel probability image and a weighted foreground pixel probability image based on the initial background probability image and the initial foreground pixel probability image, the normalized depth image, and a variability of the color and the depth of the one or more pixels;

initiating an alpha matting process to obtain an alpha mask to blend a virtual object and the foreground of the at least one pixel classification image based on determining a color of the unknown pixels; and rendering a final composition of an augmented reality image containing the virtual object occluded by the occluding object based on applying the alpha mask to pixels in the at least one pixel classification image.

* * * * *